July 27, 1965 B. STAHMER 3,196,913
MACHINE FOR PIERCING RAW POTATO CHIPS
Filed Sept. 25, 1962
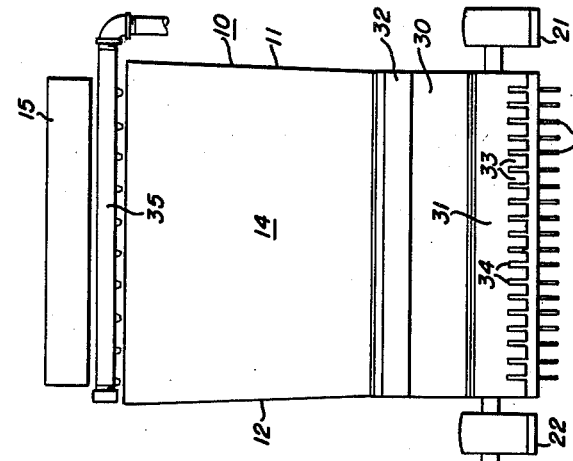
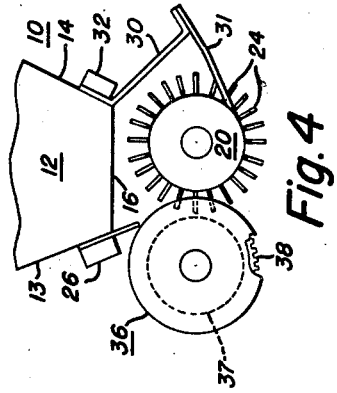
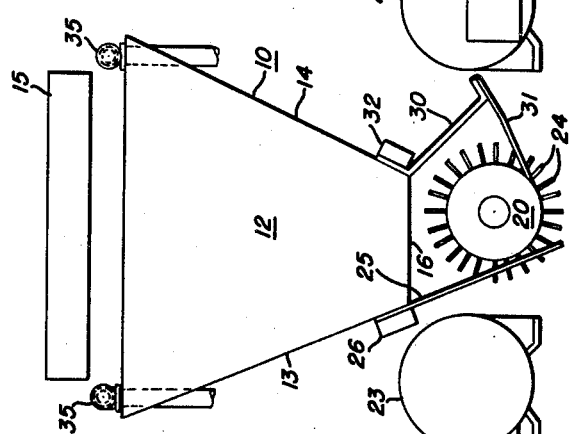
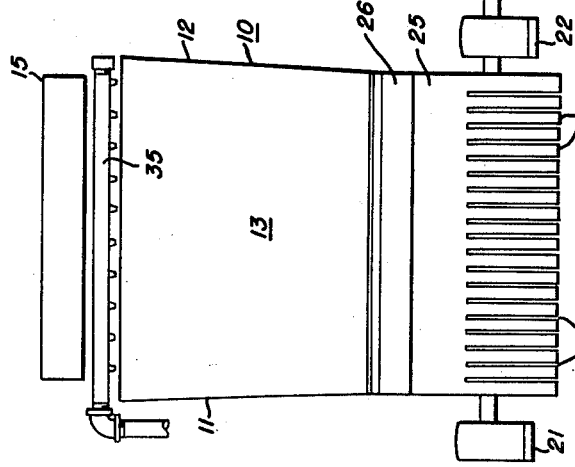
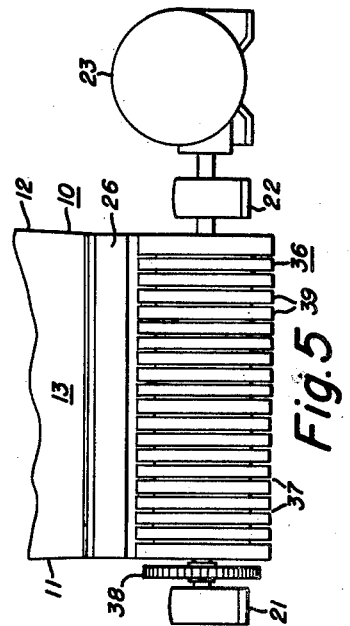
INVENTOR.
BERNHARDT STAHMER
BY Woodling, Krost,
Granger and Rust

United States Patent Office 3,196,913
Patented July 27, 1965

3,196,913
MACHINE FOR PIERCING RAW
POTATO CHIPS
Bernhardt Stahmer, 1509 Chicago St., Omaha, Nebr.
Filed Sept. 25, 1962, Ser. No. 226,071
4 Claims. (Cl. 146—1)

This invention relates to a machine for piercing raw potato chips.

An object of the invention is to provide for piercing raw potato chips by feeding the raw chips to a punching means by the aid of a hopper in which the raw chips may be washed down by water to the punching means.

Other objects and a fuller understanding of the invention may be had by referring to the following description and claims, taken in conjunction with the accompanying drawing, in which:

FIGURE 1 is a side view of a machine embodying the features of my invention;

FIGURE 2 is a front view of the machine in FIGURE 1;

FIGURE 3 is a rear view of the machine in FIGURE 1;

FIGURE 4 is a fragmentary view of FIGURE 1, showing a modified form of the invention; and FIGURE 5 is a front view of FIGURE 4.

The machine comprises principally a hopper 10 and a rotating shaft 20 having a plurality of punching means 24 projecting outwardly from the shaft. The hopper has vertical sides 11 and 12 and converging sides 13 and 14. The hopper is arranged to be located under a suitable potato slicing machine indicated by the reference character 15. As the potatoes are sliced, the sliced chips fall down into the hopper.

The lower end of the hopper is provided with an exit opening 16 directly above the rotating shaft 20, which is supported at each end by support bearings 21 and 22 and driven by a gear motor drive 23. The punching means 24 on the rotating shaft 20 are preferably round in the neighborhood of one-sixteenth inch in diameter and are spaced in the neighborhood of three-eighths inch apart in both the circumferential direction and in the crosswise direction.

At the lower end of the converging side 13 is mounted a support plate 25. This support plate 25 may be fastened to the converging side 13 by any suitable means, such as for example a support bar 26 secured to the outside of the converging side 13. The lower edge portion of the support plate 25 has a plurality of support fingers 27 with slots or spaces 28 therebetween. The support fingers 27 fit between the circumferential rows of the punching means 24. As the shaft 20 is rotated, the punching means 24 pierce the raw potato chips supported on the support fingers 27 and project into the slots or spaces 28 therebetween. On the rear side of the machine, there is scraper means 31 to remove the pierced raw potato chips from the punching means 24. The scraper means 31 may be fastened to the rear converging side 14 of the hopper 10 by any suitable means, such as for example by a support block 32 and a bracket 30. The scraper means has a plurality of fingers 33 with slots 34 therebetween. The scraper fingers 33 fit between the circumferential rows of the punching means and as the shaft 20 is rotated, the punching means 24 pass through the slots 34 to remove the pierced raw potato chips from the punching means.

As the raw potato chips fall into the hopper 10, they may be washed down the inside of the hopper by water. The water may be supplied through pipes 35 having suitable jets to spray the water against the sloping sides of the hopper. In some cases, it is unnecessary to have a supply of water as usually enough water is available from the slicing machine 15 for washing the raw chips down the inside of the hopper. In either case, there is water supply means to wash the sliced potato chips down the inside of the hopper to the rotating shaft and the punching means.

FIGURE 4 is a fragmentary view of FIGURE 1 and shows a modified view of the invention in that a roller 36 having supporting lands 39 with grooves or spaces 37 therebetween replaces the slotted fingers 27 having slots or spaces 28 therebetween. The roller 36 may be driven by a gear 38 so that the roller revolves in a clockwise direction as the rotating shaft 20 is driven in a counterclockwise direction. In FIGURE 4 as the shaft is rotated, the punching means 24 pierce the raw potato chips supported on the lands 39 of the roller 36 and project into the grooves or spaces 37. The rotating shaft 20 and the grooved roller 36 may be constructed substantially the same as shown in my co-pending application Serial No. 797,694 (now Patent No. 3,084,730). The operation of the machine in FIGURE 4 is substantially the same as that shown in FIGURE 1, and here again, the potato chips are washed down the inside of the hopper by water, either supplied by the pipes 35 or the water usually available from the slicing machine 15.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A machine for piercing raw potato chips from one side of the chip towards the other side thereof comprising, a hopper to receive sliced raw potato chips, said hopper having an exit opening and vertically extending sides converging towards said exit opening, a rotating shaft mounted under said exit opening, said shaft having a plurality of punching means spaced apart both in a circumferential direction and in an axial direction to form circumferential rows with axial intervals therebetween, said punching means projecting outwardly from said shaft, support surface means comprising a support plate having a plurality of support fingers with slots therebetween, said support fingers respectively fitting in said axial intervals between said rows of said punching means, said punching means piercing said raw chips supported on said support fingers and projecting into said slots, scraper means to remove the pierced raw potato chips from said punching means, and water supply means to wash the sliced raw potato chips down the inside of the hopper to the rotating shaft and the punching means.

2. In combination, a potato slicing machine, water supply means, a piercing machine for piercing raw potato chips from one side of the chip towards the other side thereof, said piercing machine comprising, a hopper to receive a supply of water from said water supply means and to receive sliced raw potato chips from said potato slicing machine, said hopper having an exit opening and vertically extending sides converging towards said exit opening, a rotating shaft mounted under said exit opening, said shaft having a plurality of punching means spaced apart both in a circumferential direction and in an axial direction to form circumferential rows with axial intervals therebetween, said punching means projecting outwardly from said shaft, support surface means comprising a plurality of support surfaces with spaces therebetween, said support surfaces respectively fitting in said axial intervals between said circumferential rows of said punching means, said supply of water washing said sliced raw potato chips down the inside of the hopper to said support surfaces and to said punching means, said punching means piercing said raw chips supported on said support surfaces and projecting into said spaces, and scraper means to remove the pierced raw potato chips from said punching means.

3. In combination, a potato slicing machine, water supply means, a piercing machine for piercing raw potato chips from one side of the chip towards the other side thereof, said piercing machine comprising, a hopper to receive a supply of water from said water supply means and to receive sliced raw potato chips from said potato slicing machine, said hopper having an exit opening and vertically extending sides converging towards said exit opening, a rotating shaft mounted under said exit opening, said shaft having a plurality of punching means spaced apart both in a circumferential direction and in an axial direction to form circumferential rows with axial intervals therebetween, said punching means projecting outwardly from said shaft, support surface means comprising a plurality of support surfaces with slots therebetween, said support surfaces respectively fitting in said axial intervals between said circumferential rows of said punching means, said supply of water washing said sliced raw potato chips down the inside of the hopper to said support surfaces and to said punching means, said punching means piercing said raw chips supported on said support surfaces and projecting into said slots, and scraper means to remove the pierced raw potato chips from said punching means.

4. In combination, a potato slicing machine, water supply means, a piercing machine for piercing raw potato chips from one side of the chip towards the other side thereof, said piercing machine comprising, a hopper to receive a supply of water from said water supply means to to receive sliced raw potato chips from said potato slicing machine, said hopper having an exit opening and vertically extending sides converging towards said exit opening, a rotating shaft mounted under said exit opening, said shaft having a plurality of punching means spaced apart both in a circumferential direction and in an axial direction to form circumferential rows with axial intervals therebetween, said punching means projecting outwardly from said shaft, support surface means comprising a roller having a plurality of support lands with grooves therebetween, said support lands respectively fitting in said axial intervals between said rows of said punching means, said supply of water washing said sliced raw potato chips down the inside of the hopper to said support lands and to said punching means, said punching means piercing said raw chips supported on said support lands and projecting into said grooves, and scraper means to remove the pierced raw potato chips from said punching means.

References Cited by the Examiner

UNITED STATES PATENTS

| | | | |
|---|---|---|---|
| 528,696 | 11/94 | Sergeant | 83—660 X |
| 674,131 | 5/01 | Barngrover | 146—56 |
| 1,729,611 | 10/29 | Forrest | 146—56 |
| 2,326,407 | 8/43 | Steinwand. | |

OTHER REFERENCES

Sachse: German printed application 1,003,030, Feb. 24, 1957 (1 sht. dwg.; 2 pp. spec.).

J. SPENCER OVERHOLSER, *Primary Examiner.*